ically shaped metal band spirally formed into a plurality of winding groups wherein each group includes a plurality of interlocked windings. Each of the winding groups are connected to each other by at least one free winding wherein the leading portion of a first winding is separated from the leading portion of a corresponding subsequent winding and interlocking is prevented for at least one revolution. Each free winding, which constitutes one circumference of the piping, is formed by the insertion of a shaping tool into contact with the leading portion of the free winding prior to the point where this leading portion would normally interlock with the leading portion of a corresponding subsequent winding one revolution later. The shaping tool alters the cross-sectional arrangement of the metal band such that interlocking of that portion of this spiralling band which is contacted by the shaping tool is prevented. A timer controls the duration of the interval of time during which interlocked windings are spirally formed and the same time also controls the duration of the interval of time during which the shaping tool is inserted into contact against the leading portion of a winding when forming a free winding. Each free winding may be severed widthwise in order to separate adjacent winding groups into individual sections of piping. By the incorporation of the free winding concept, the area of burrs on the free end of each individual section is limited to the area of the widthwise cut.

United States Patent [19]

McGowen

[11] 4,197,728
[45] Apr. 15, 1980

[54] FLEXIBLE PIPING METHOD AND APPARATUS OF PRODUCING SAME

[76] Inventor: Lloyd E. McGowen, High St., R.R. 63, West Lebanon, Ind. 47991

[21] Appl. No.: 941,125

[22] Filed: Sep. 11, 1978

[51] Int. Cl.$^2$ ............................................. B21C 37/12
[52] U.S. Cl. .......................................... 72/49; 72/135; 138/135
[58] Field of Search ............................ 72/49, 50, 135; 228/147, 173 F; 138/122, 135

[56] References Cited

U.S. PATENT DOCUMENTS

| | | | |
|---|---|---|---|
| 1,383,187 | 6/1921 | Brinkman et al. | 72/49 |
| 1,596,215 | 8/1926 | Palmer | 72/49 X |
| 1,617,583 | 2/1927 | Fentress et al. | 72/49 |
| 2,944,337 | 7/1960 | Coleman | 72/135 |
| 3,073,944 | 1/1963 | Yuter | 72/49 X |
| 3,682,203 | 8/1972 | Lyndhurst | 72/49 |
| 3,938,558 | 2/1976 | Anderon | 138/122 |

FOREIGN PATENT DOCUMENTS 2034102  1/1972  Fed. Rep. of Germany.

Primary Examiner—Leon Gilden
Attorney, Agent, or Firm—Woodard, Weikart, Emhardt & Naughton

[57] ABSTRACT

A length of flexible metal piping includes an interlocka-

14 Claims, 16 Drawing Figures

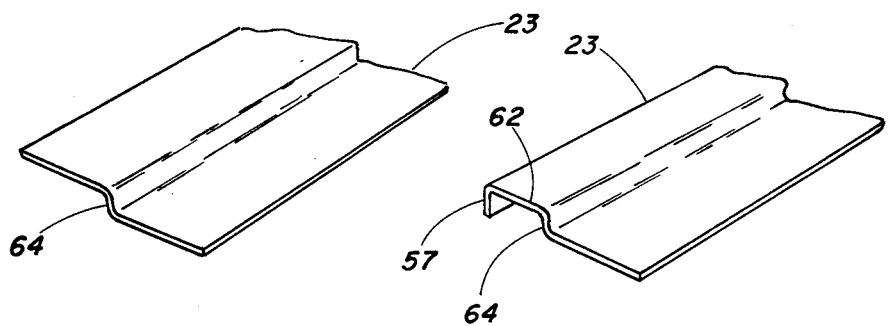
Fig. 1a  Fig. 1b
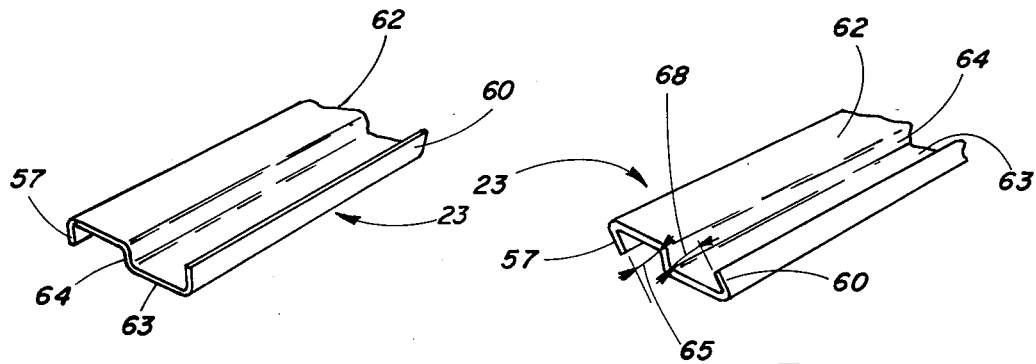
Fig. 1c  Fig. 1d
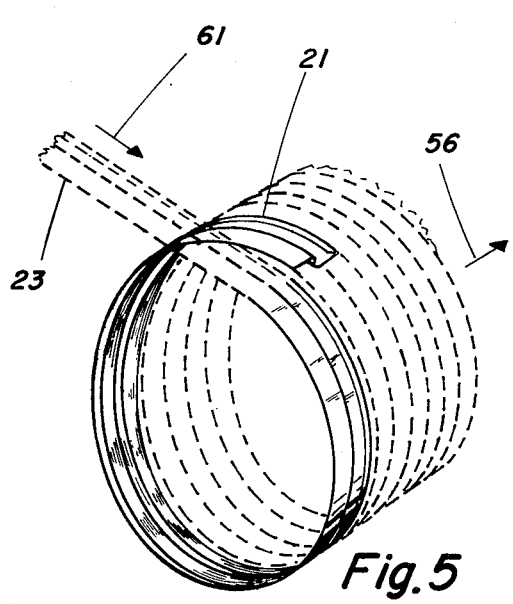
Fig. 5
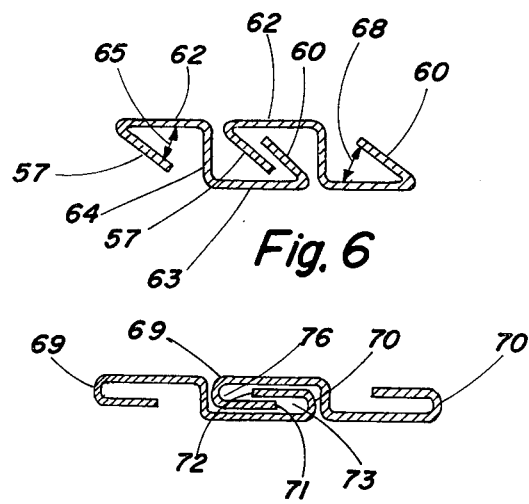
Fig. 6
Fig. 7

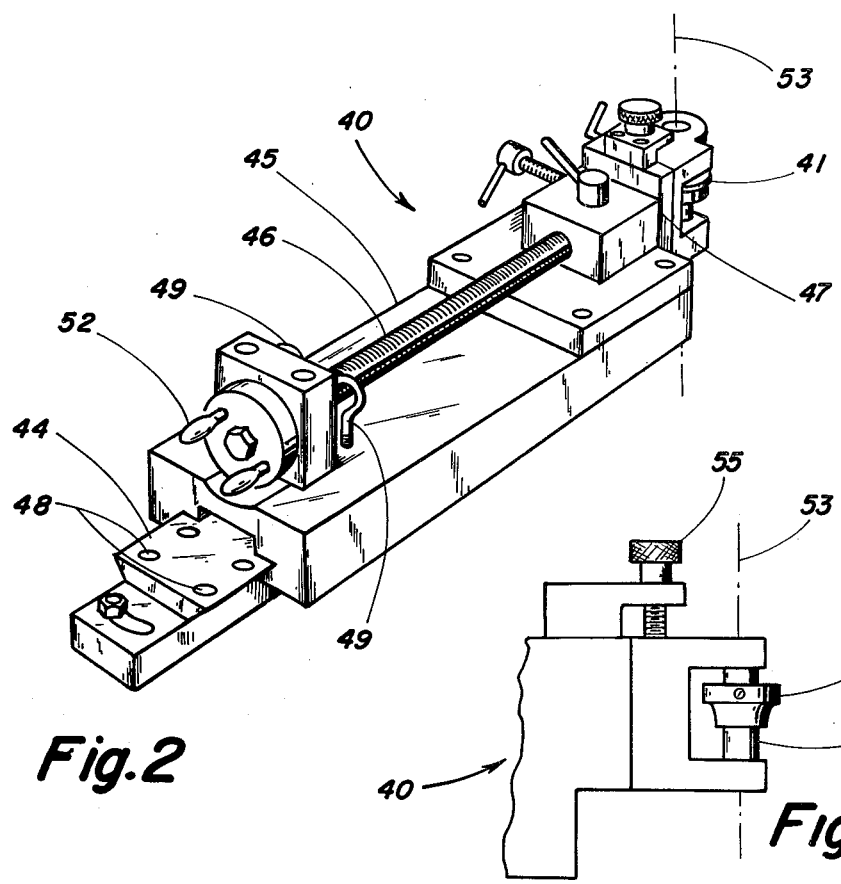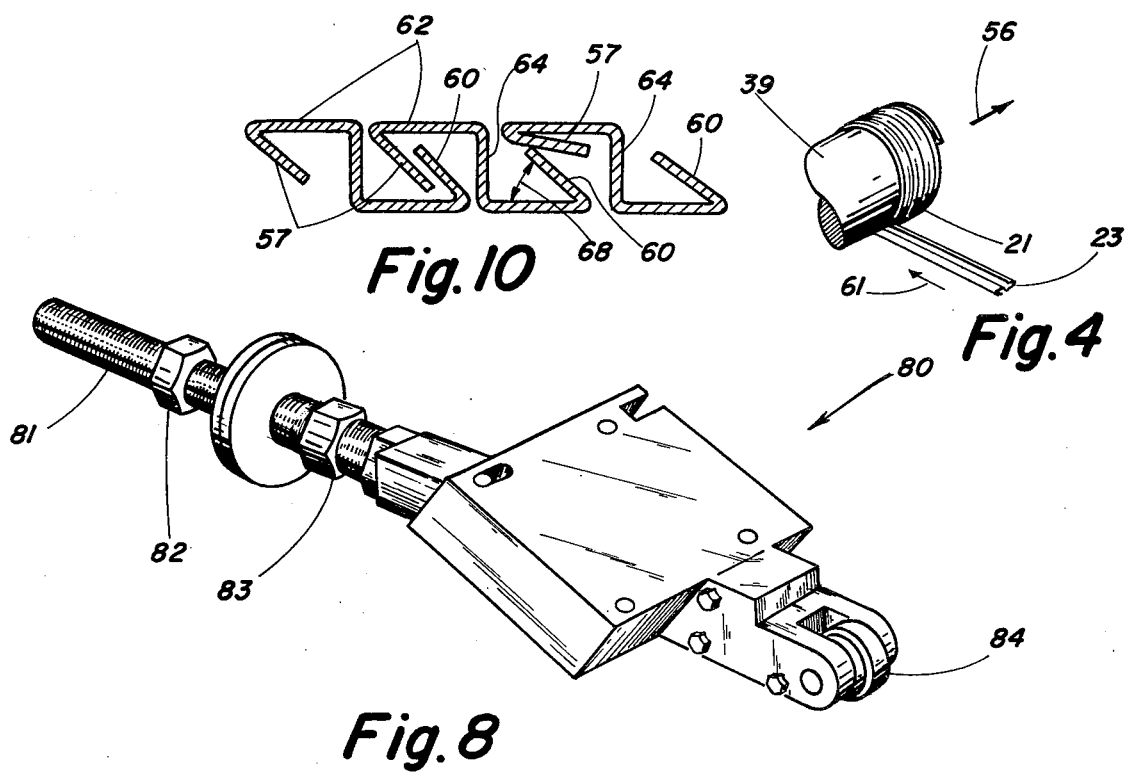

U.S. Patent    Apr. 15, 1980    Sheet 4 of 4    4,197,728
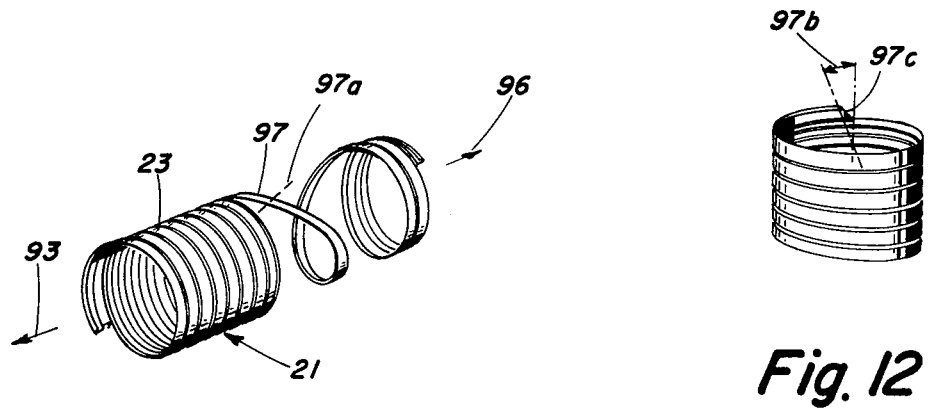
Fig. 11
Fig. 12
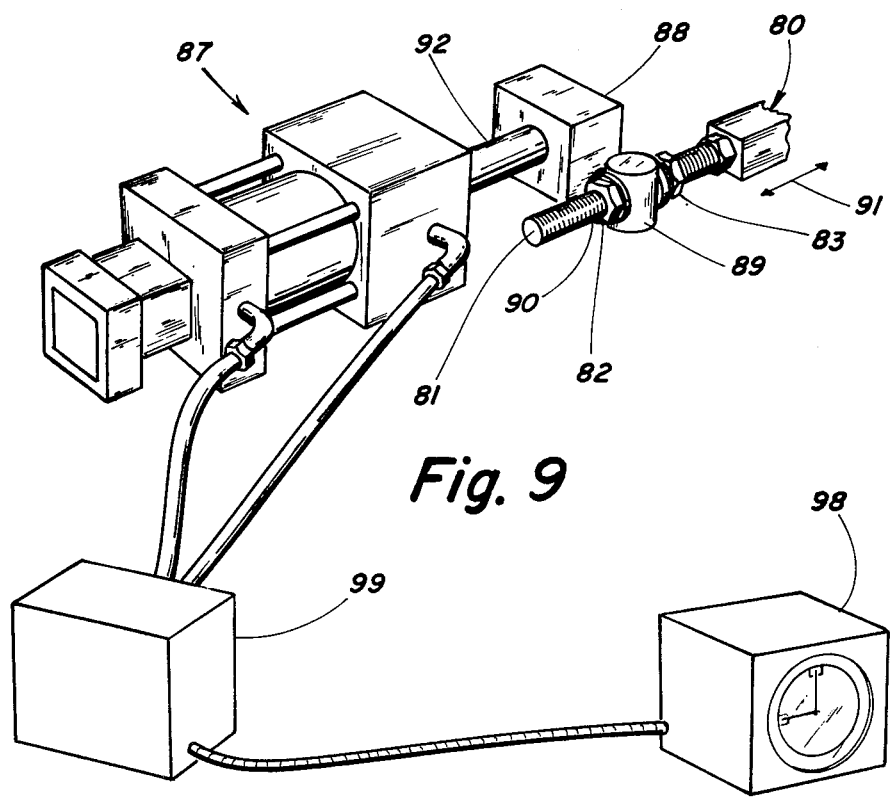
Fig. 9

FLEXIBLE PIPING METHOD AND APPARATUS OF PRODUCING SAME

BACKGROUND OF THE INVENTION

This invention relates in general to machines for winding metal bands in a spiral arrangement and the products such machines produce and in particular to machines for forming flexible metal piping, and the piping produced by such machines.

The type of flexible metal piping disclosed in this application consists of a continuous metal band spirally wound in an arrangement wherein the leading portion of one winding interlocks with the leading portion of a subsequent winding one revolution later and this interlocking continues winding after winding. Where the trailing portion of one winding ends, the leading portion of the following, contiguous winding begins, although the concept of the beginning point and ending point is somewhat arbitrary due to the continuous nature of the metal band.

Concepts and features relating to such types of flexible metal piping and their fabricating apparata are disclosed by the following listed patents:

| Patent No. | Patentee | Issue Date |
| --- | --- | --- |
| 1,383,187 | Brinkman et al. | 6/28/21 |
| 1,596,215 | Palmer | 8/17/26 |
| 3,073,944 | Yuter | 1/15/63 |
| 1,617,583 | Fentress et al. | 2/15/27 |
| 2,944,337 | Coleman | 7/12/60 |
| 3,682,203 | Foti et al. | 8/08/72 |

Brinkman et al. discloses an apparatus for making tubes wherein, by a series of dies and rollers, an initially flat metal band is continuously spirally wound on a mandrel thereby forming a plurality of interlocked convolutions.

Palmer discloses a method of making flexible metal tubes wherein, by a series of dies and rollers, an initially flat metal strip is spirally wound such that the adjacent overlying portion of each turn of the strip is anchored on adjacent turns thereby preventing circumferential twisting or unwinding of the strip. The interlocking shape is conventional and the tubing produced is of a continuous length for several feet.

Yuter discloses a method of welding and cutting helical formed tubing into sections, wherein the various windings of a flat metal band are joined together at their respective edges by a helical welded seam. The windings do not interlock with each other and it is felt that this reference has limited applicability to the subject application.

Fentress et al. discloses a method of and machine for manufacturing spiral metal tubes wherein the finished product does not rotate as it leaves the tube or spring forming tool with the result that a commercial tube or spring of any desired length may be produced by the machine, in which the power required to operate the machine is materially reduced.

Coleman discloses that flexible metal tubing, formed by winding an S-shaped strip, may be cut into lengths by cutting the strip and unscrewing the two pipe sections. However, the adjacent metal strip windings formed by the disclosed apparatus, do not interlock with each other and the nature of widthwise cutting disclosed in the patent would not be suitable, as disclosed, if the windings were interlocked with each other.

Foti et al. discloses a flexible metal hose of the type formed from a helical wound metal strip with the edges of adjacent helical turns deformed so as to interfold slidably so that adjacent helical turns slide axially against one another to permit the hose to be flexed along its axis.

It is noted that all of the above references which involve interlocked windings do not provide any means, other than the obvious method of hacksawing, by which to separate the continuous piping length into shorter lengths. Such a method, hacksawing, will result in 360° (a full pipe circumference) of burrs on each free end which is cut and this condition is unacceptable for most applications. Consequently, a subsequent manual deburring operation must be performed if shorter pipe lengths are to be obtained from the longer continuous length. The only reference which suggests a reduced burr content way of obtaining individual pipe sections does not contemplate interlocked windings and thus would not be suitable for that particular style of flexible metal piping.

None of the references listed even remotely suggest means for conditionally segmenting a continuous length of piping, of interlocked windings, into a plurality of uniform, shorter sections wherein the severing of shorter sections from each other is performed by making a widthwise cut through a spirally wound metal band, thereby substantially reducing the burr content which would otherwise be present at each free end of these shorter sections of piping. Furthermore, none of the references listed suggest means for automatically controlling the length of, and uniformity of length between, these shorter sections of pipe. Nor do any of these references suggest the fabrication of a free (noninterlocked) winding as the means for conditionally segmenting the continuous length of piping into a plurality of shorter lengths.

The various shortcomings of these references, if overcome by incorporating novel features, would result in improved flexible metal piping and an improved method of manufacturing the same.

SUMMARY OF THE INVENTION

An improved flexible metal pipe fabricating machine of the type wherein a relatively thin strip of metal is intially formed into an interlocking shape, and wherein the strip of metal is spirally wound on a mandrel while being acted on by ironer rollers and wherein the leading end portion of a first winding interlockingly engages the leading end portion of a corresponding subsequent winding on the next revolution, wherein according to a typical embodiment of the present invention, the improvement includes a timer having each cycle period separated into two time intervals, a tooling attachment automatically movable into contact with the first winding prior to interlocking engagement with the subsequent winding during one of the two time intervals and the tooling attachment being designed to form the leading end portion during the contact in such a way as to prevent the interlocking engagement from occurring.

A method of forming a flexible metal pipe according to another embodiment of the present invention includes the steps of setting a timer for a first interval of time and a second interval of time, forming a metal band into an interlockable shape, spiralling this formed metal band into a plurality of interlocked windings, wherein the leading end portion of each winding interlockingly engages the leading end portion of a corresponding subsequent contiguous winding and the interlocking continues throughout the entire circumference of each winding, automatically moving a forming tool against the interlockably shaped metal band and shaping a portion of the interlockably shaped metal band such that the leading end portion of one winding and the leading end portion of a subsequent winding are prevented from achieving the interlocking engagement, thereby forming at least a portion of one free winding between the interlocked windings.

One object of the present invention is to provide an improved method of forming a flexible metal pipe.

Another object of the present invention is to provide an improved metal pipe.

Related objects and advantages of the present invention will be apparent from the following description.

BRIEF DESCRIPTION OF THE DRAWINGS

FIGS. 1a, 1b, 1c and 1d are partial perspective views of a formed metal band, each Figure associated with a different forming stage of the FIG. 1 machine.

FIG. 2 is a perspective view of an ironer roller assembly comprising a portion of the FIG. 1 machine.

FIG. 3 is a partial plan view of one end of the FIG. 2 ironer roller assembly.

FIG. 4 is a perspective view of flexible metal band being wound on a mandrel which comprises a portion of the FIG. 1 machine.

FIG. 5 is a perspective view of one winding of the FIG. 1d metal band as portions begin to interlock.

FIG. 6 is a sectional view of one portion of the FIG. 1d metal band interlocking with another portion one circumference later taken along line 6—6 of FIG. 4 and prior to being acted upon by the FIG. 2 ironer roller assembly.

FIG. 7 is a section view corresponding to the view of FIG. 6 after being acted upon by the FIG. 2 ironer roller assembly.

FIG. 8 is a perspective view of a tooling attachment comprising a portion of the FIG. 1 machine.

FIG. 9 is a diagrammatic view of a timer, pump and cylinder arrangement comprising a portion of the FIG. 1 machine.

FIG. 10 is a section view of the FIG. 4 metal pipe showing one free winding produced by being acted upon by the FIG. 8 tooling attachment.

FIG. 11 is a perspective view of the FIG. 10 free winding longitudinally extended.

FIG. 12 is a perspective view of a section of flexible metal pipe corresponding to a typical embodiment of the present invention.

DESCRIPTION OF THE PREFERRED EMBODIMENTS

Figure 1:
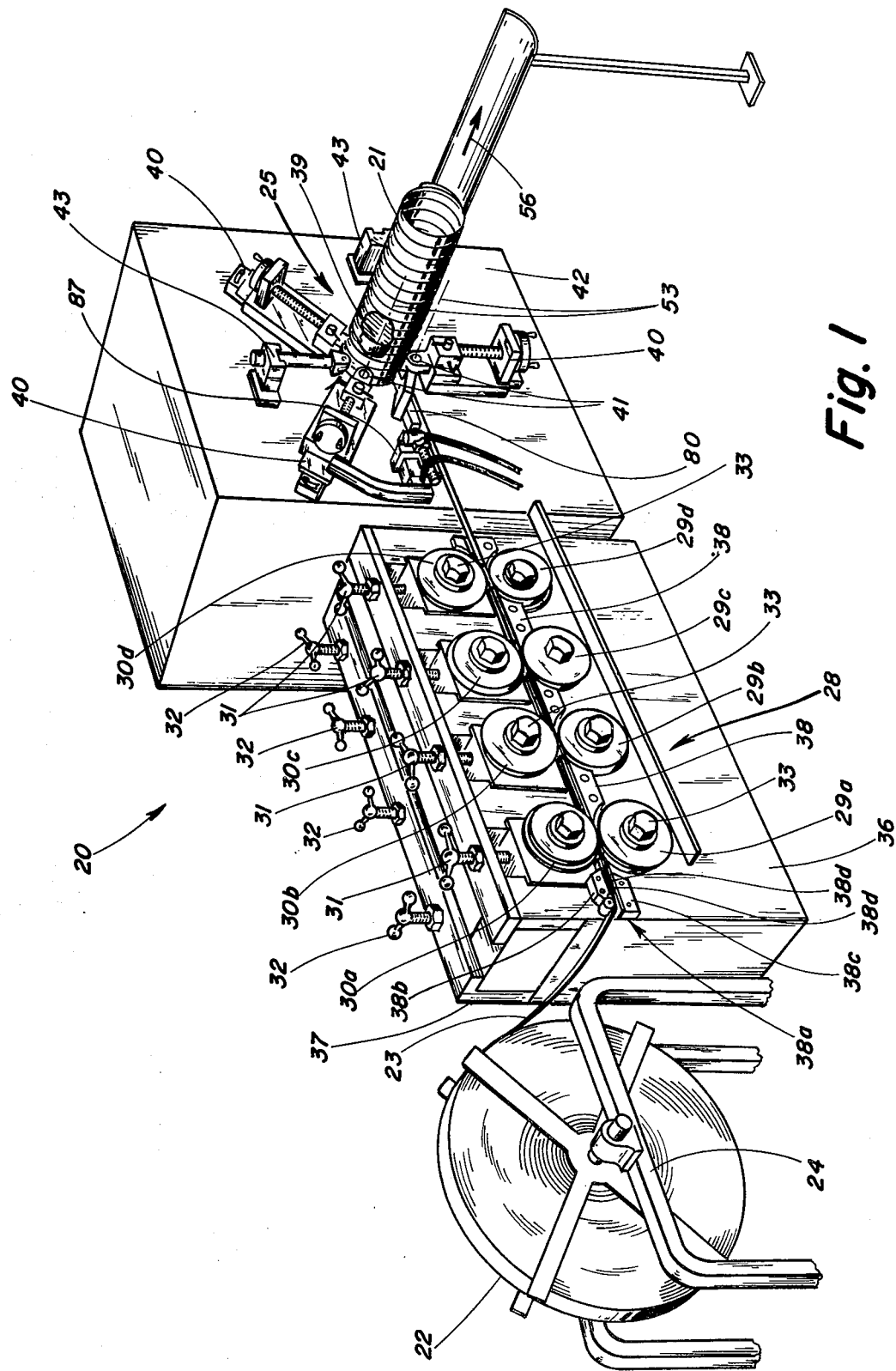
FIG. 1 is a perspective view of a flexible metal pipe forming machine according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a flexible metal pipe forming machine 20 oriented as it would be when in use and forming a flexible metal pipe 21 from a coiled supply 22 of a flat metal band 23. A full coiled supply 22 may contain over a thousand feet of band meterial and although the weight of such a coiled supply may be significant, the coiled supply 22 freely turns in support rack 24 as machine 20 pulls on band 23 during the forming of flexible metal pipe 21. Preceding pipe-forming location 25 is a band-forming station 28 through which the flat metal band 23 passes after coming off of coiled supply 22. Band-forming station 28 includes four bottom roller dies 29a, 29b, 29c and 29d and four top roller dies 30a, 30b, 30c and 30d. Each pair of roller dies (29a–30a, 29b–30b, etc.) has a particular male-female periphery arrangement such that as band 23 passes therethrough it is shaped and formed into the various cross-sectional shapes which are illustrated by FIGS. 1a, 1b, 1c and 1d. FIGS. 1a–1d are arranged in such a manner that when looking inwardly at the completely exposed left end where the edge cross-sectional area is fully illustrated, this direction of viewing is toward the direction of forming location 25 and along the length of band 23. An appreciation for typical die roller edge geometry may be obtained by referring to U.S. Pat. No. 1,596,215 issued Aug. 17, 1926 to Palmer. However, such die roller edge geometry is well known in the art, as well as modifications thereto, and further details as to the precise geometry are not felt to be necessary in light of the illustrated cross-sectional shapes of band 23. Reference numeral 23 is used throughout this application to refer to the metal band, but it is to be understood that the cross-sectional shape of this band will change during its transition from the coiled supply 22 to the finally formed pipe 21. The various stage-by-stage changes which metal band 23 undergoes will be discussed fully, however, the reference numeral will remain the same throughout.

The group of bottom roller dies are stationary as to their location vertically and horizontally relative to station 28, but the group of top roller dies are vertically adjustable by means of cranks 31 and 32 and the linkages associated with these cranks. These cranks may be manually turned in order to alter the location of the cylindrical axis of each top roller die. The gear drive arrangement for the roller drives is located internal to station 28 between cranks 31 and 32 and each roller die has a drive axle 33 which horizontally extends in a substantially parallel arrangement with the other drive axles. The opposite ends of each drive axle 33 are supported by the front and rear panels 36 and 37 of station 28, and cranks 31 and 32 may be used either to move the entire axle vertically or merely to move one end of the axle either up or down. It is thus possible to vary the degree of separation between the coacting outer edges of the top and bottom roller dies of each pair of roller dies as well as to shift one end of a drive axle in order to reestablish parallelism of the drive axle relative to the other drive axles or relative to its individual roller die.

As band 23 is pulled through the coacting pairs of roller dies, the roller dies act on this band material bending it, stage by stage, until the finished shape, immediately prior to being spirally wound into flexible metal pipe 21, corresponds to FIG. 1d. Roller dies 29a and 30a first place a double bend in band 23 (see FIG. 1a), then roller dies 29b and 30b turn down one side (see FIG. 1b)

and roller dies 29c and 30c turn up the opposite side. The final forming stage, controlled by roller dies 29d and 30d, pivots the upturned and downturned sides inwardly toward the center of band 23.

A partially enclosed trough 38 extends from roller dies 29a and 30a to forming location 25 and shields band 23 from encountering foreign matter, such as, for example, metal shavings and grease which might affect the shapes created by the various roller die pairs and which might affect the construction of the resultant flexible metal pipe 21. Trough 38 is open between each coacting pair of roller dies, but is otherwise covered. Preceding the first pair of roller dies 29a and 30a and mounted to front panel 36, is a wiper assembly 38a through which metal band 23 passes. Wiper assembly 38a includes a top portion 38b and a bottom portion 38c with a slit-like clearance therebetween. There is a soft fiber-like wiper material 38d bonded to each portion which loosely fills this slit-like clearance and wipes dirt, grease or other matter from both surfaces of band 23 as the band passes through wiper assembly 38a. Other devices may also be located in this area such as a thickness sensor to signal if band thickness goes out of tolerance. It is to be understood that the periphery contour of the various roller dies could be infinitely varied in order to form different widths and different thicknesses of metal band into differnt shapes. The selected male-female arrangement of each pair of roller dies must take into consideration the material properties of the metal band, its size and the final desired shape.

At pipe-forming location 25, metal band 23 exits from trough 38 and is guided around mandrel 39 which horizontally extends out of panel 42 of forming machine 20. Positioned around mandrel 39 are three ironer roller assemblies 40 which act on metal band 23 as it spirals around the mandrel. The three ironer roller assemblies 40 are located approximately 120° apart and each one includes an ironer roller 41 at the end of the assembly which is adjacent to pipe 21. Also located on panel 42 are two idler roller assemblies 43 which are also approximately 120° apart and positioned as illustrated between the ironer roller assemblies 40. The idler roller assemblies 43 act to guide and control the direction of movement of band 23 as it is spirally wound around mandrel 39.

Each ironer roller assembly (see FIG. 2) includes a support plate 44, a top slidable member 45, adjustable arm 46 and ironer roller support block 47. Support plate 44 is attached to panel 42 and across the upper surface of plate 44 are a series of pairs of close tolerance holes 48. Slidable member 45 is positioned relative to support plate 44 by means of two eye pins 49 which extend through member 45 into a corresponding pair of holes 48. There is a dovetail-like slide fitting between the edges of plate 44 and slidable member 45 and it is possible to change the distance between roller 41 and mandrel 39 by removing eye pins 49, sliding member 45 in either direction along plate 44 and then relocating the eye pins 49 into a new pair of holes 48. This constitutes a course adjustment and fine adjustment to the distance of separation, in the distance of separation between roller 41 and mandrel 39 is achieved by crank 52 and adjustable arm 46. Once set to the proper distance, set screw type locking may be employed on arm 46 in order to prevent minor movement or location changes due to machine vibration and the like. The position of roller 41 along a line 53, which is parallel to the cylindrical axis of mandrel 39, when assembly 40 is mounted to panel 42, may be initially and permanently set by the positioning of roller 41 on shaft 54 as part of ironer roller support block 47. It is also possible to arrange roller 41 so that it may be selectively shifted along line 53 by screw adjust 55 or similar means. The position of each ironer roller along its corresponding axis line 53 is selected so that band 23 will be wound with a particular spiral pitch as it wraps around mandrel 39. As previously mentioned, idler rollers 43 also act on metal band 23 in order to assure proper direction and proper spiral pitch during this winding. Although the degree of pitch is changeable by shifting the position of the ironer rollers and the idler rollers, the actual amount of pitch is normally slight.

As the formed metal band 23 (FIG. 1d) begins to wrap around mandrel 39, the leading end of the band will spiral back onto itself, except that it will be shifted outwardly from panel 42, in the direction of arrow 56, by approximately one-half the width of the band such that the downturned side portion 57 slides in underneath the upturned side portion 60 beginning one revolution later. With this initial interlocking accomplished, band 23 continues to spiral in an interlocking manner revolution after revolution such that the leading end portion of one winding, a winding being understood to constitute a one revoltuion wrap of band 23 as part of pipe 21, interlocks with the leading end portion of a corresponding subsequent contiguous winding as a new rovolution (and a new winding) begins. As the spriallling of the metal band continues, the interlocking of contiguous windings continues throughout the entire circumference of each winding. With a continuous spiralling band, as herein disclosed, there is no identifiable break between consecutive windings and the designating of a particular winding may be varied, depending upon the points circumferentially around pipe 21 which one selects as the beginning and ending points for the particular winding. Inasmuch as a winding has been defined to constitute only a single revolution of pipe 21, the point interlocking begins between contiguous windings is where the arbitrarily selected beginning point of a first winding spirals into contact with the beginning point of the subsequent contiguous winding which is one revolution (or one circumference) later. Once interlocking begins, the remainder of the first winding will interlock with its corresponding portion of the subsequent contiguous winding and this repeats winding after winding.

FIG. 4 illustrates the manner in which band 23 spirals back onto itself around mandrel 39 and forms pipe 21. Arrow 61 indicates the movement of band 23 as it is pulled off of coiled supply 22 and as winding after winding are added, pipe 21 increases in length as pipe 21 moves outwardly along a support trough in the direction of arrow 56. FIG. 5 is an illustration of one winding separated from the pipe and oriented so as to show the leading end portions of contiguous windings as they begin to interlock. Note that a one revolution winding does not in fact interlock with itself but rather that the leading end portion of one winding interlocks with the corresponding leading end portion of the corresponding subsequent contiguous winding. FIG. 6 illustrates a cross-sectional view of the relationship between these end portions, once the first winding and the subsequent winding interlock, as well as the positional relationship of downturned side portion 57 and upturned side portion 60.

It has been discussed that ironer roller assemblies 40 and the corresponding ironer rollers 41 on each, control the spiral pitch of pipe 21. These ironer rollers 41 also serve another function which is to compress and simultaneously shape the interlocked metal band such that the height of the band (constituting the wall thickness of pipe 21) is reduced while side portions 57 and 60 are arranged concentrically to each other with the cylindrical axis of pipe 21 comprising the reference axis of such concentricity (see FIG. 7). Again it is to be understood that the selected geometry of the periphery of these ironer rollers 41 as well as the degree of force they apply to band 23 control the ultimate interlocked and compressed shape which is illustrated by FIG. 7. Between the time band 23 exits from the last pair of roller dies 29d and 30d and the time band 23 is compressed, band 23 includes, in addition to downturned side portion 57 and upturned side portion 60, an outer annular top portion 62, an inner annular bottom portion 63 and a connecting radial portion 64 therebetween. Although FIG. 6 shows only a cross-sectional shape, it is to be understood that the shape illustrated extends in a continuous circumferential manner, with a corresponding pitch, around pipe 21, winding after windng. The included angles 65 and 68 between top portion 62 and side portion 57 and between bottom portion 63 and side portion 60, respectively, are approximately 45° and the open area provided by these angles is sufficient to enable the slidable nesting of side portion 57 of a first winding within angle 68 of the subsequently formed winding, one circumference later. Initially formed side portions 57 and 60 are substantially parallel to each other. The final forming and compression step performed by ironer rollers 41 closes angles 65 and 68 to virtually 0°, there being clearance between these portions, constituting the sides of the angle, solely because of the required bend radius which is required at ends 69 and 70. End 70 (of the subsequent winding) is positioned adjacent connecting radial portions 64 of the first winding and end 69 (of the first winding) is positioned adjacent connecting radial portion 64 of the subsequent winding. In this manner, edges 71 and 72 will overlap each other and the length of their overlap is greater than the clearance between ends 69 and 70 and their corresponding adjacent connecting radial portions 64 so that the windings cannot be manually pulled apart, unwound or otherwise separated from each other. Pipe 21 is described as flexible because of its ability to be flexed along its axis, in any direction, and although the various windings interlock, shifting movement of the windings is possible due to the fact that clearance areas 73 and 76 surround edges 71 and 72, respectively, and allow longitudinaly extension, during flexing as edge 71 moves toward end 70 and as edge 72 moves toward end 69.

Although the forming machine 20 and the particular style of flexible metal pipe construction discussed up to this point are capable of providing flexible metal piping of virtually infinite diameter and length, each section of piping being durable and uniform, there do exist certain shortcomings, and these same shortcomings are present with all styles of flexible metal pipes produced by other, yet related, means. For example, such piping is normally fabricated in continuous lengths which may be as long as 25 to 30 feet. However, the final usage of such piping may be in sections of only 2 or 3 feet, or even less. Consequently, this larger length must be cut or somehow segmented into individual sections. Typically, due to the interlocking arrangement of windings, this is done by hacksaw cutting across the pipe in a plane which is generally perpendicular to the cylindrical axis. The result is a pipe section which has two free ends, at least one of which has a significant number of sharp burrs thereon. Except for the first and last sections of pipe which are severed from the continuous length of piping, each cut section of pipe will in fact have sharp burrs on both free ends. In most cases, these burrs should be removed prior to usage of the pipe sections, and if quantities of such pipe sections are being sold to an original equipment manufacturer (O.E.M.), it is normally required that the materials be supplied burr-free. Burr removal is a time-consuming and consequently costly step due to the nature of and the inability to automate the process. The cost of such burr removal is especially disproportionate when it is compared to the per-foot cost of the piping. A further consideration is the fact that transportation, handling and retail outlet storage of 25–30 foot lengths may be quite awkward, if not impossible.

Flexible metal pipe forming machine 20 is equipped to overcome these shortcomings by the incorporation and use of tooling attachment 80. Tooling attachment 80 (see FIG. 8) includes a support rod 81, adjustment fitting nuts 82 and 83 and roller 84. The precise arrangement of pieces comprising tooling attachment 80 may vary, but it is important that whatever the particular design chosen is, that the attachment be able to be rigidly secured at one end and have a freely turning roller at the opposite end. Tooling attachment 80 may be controlled manually by conventional machine travel means such as ball lead screw and recirculating ball nut, however, in the illustrated embodiment, tooling attachment 80 is mounted to a standard, double-acting fluid power cylinder 87 by means of support block 88 (see FIGS. 1 and 9). Disposed along one side of block 88 is a cylindrical holder 89 with a relatively large bore 90 therethrough. With support rod 81 inserted through bore 90 to a selected position and with fitting nuts 82 and 83 securely tightened against opposite sides of holder 89, tooling attachment 80 is able to be moved back and forth in the direction of arrow 91, in response to energizing and deenergizing of cylinder 87 and the corresponding movement of piston 92 between extended and retracted positions. Cylinder 87 and tooling attachment 80 are positioned directly above band 23 between the pair of roller dies 29d and 30d and forming location 25. Depending upon the pipe diameter being wound, the position of attachment 80 within cylindrical holder 89 is set so that with piston 92 extended, roller 84 will act against the side portion 57 of band 23 just before the point where the leading end portion of the first winding would typically begin to interlock with the corresponding leading end portion of the subsequent winding. Roller 84 acts in such a manner so as to bend side portion 57 toward outer annular top portion 62 thereby closing angle 65 and reducing the separation between side portion 57 and top portion 62. The resulting measurement of angle 65 will be somewhat less than 10°, depending upon the geometry of the particular metal band and the size and style of flexible metal pipe being fabricated. Attachment 80 is positioned so that the acting force of roller 84 on side portion 57 is sufficient to locate (by bending) side portion 57 above side portion 60 (see FIG. 10) of the subsequent winding and thereby prevent these two portions from assuming the nested and interlocked position illustrated in FIG. 6. So long as cylinder 87 is energized and piston 92 extended, tooling attachment 80 will act on spiralling metal band 23 preventing first windings or any portion thereof from interlocking with corresponding subsequent contiguous windings and thereby causing the creation of at least a portion of one free winding. A free winding consists of one spiral circumference of band 23 around pipe 21 wherein there is no interlocking. Although such free windings may initially appear to look the same as interlocked windings from the exterior of the pipe, such free windings are merely formed spirals of band 23 and when the groups of interlocked windings of pipe 21 which are on opposite sides of a free winding are pulled in an outwardly direction away from the free winding, the free winding will spirally unwind as it is longitudinally extended. This condition is illustrated by FIG. 11 wherein arrows 93 and 96 represent the direction of pulling forces in an outwardly direction and winding 97 is a free winding comprising one circumference of pipe 21. It is apparent then that in order to separate sections of pipe which are connected by at least a portion of one free winding (or windings) the only thing which needs to be done is to sever, widthwise, as denoted by broken line 97a, that portion of metal band 23 forming the portion of the free winding. Thereby, the extent of sharp burrs on the free ends of such separated sections of pipe is limited to the circumferential length 97b of this widthwise cut 97c, as illustrated by FIG. 12. This circumferential length of the widthwise cut in virtually all cases spans less than 5°.

Consequently, the forming machine 20 may be operated continuously as if interlocked 25- to 30-foot lengths were being produced, but at selected points in time, corresponding to positions along pipe 21, attachment 80 is extended into contact for at least one revolution in order to create a free winding. Once this 25- to 30-foot length of pipe is completed, each of the free windings, which are located between groups of interlocked windings, may be slightly unwound and then severed by a widthwise cut so that the longer length of pipe will be divided into a plurality of shorter lengths each having free ends which are virtually burr free.

Although the length of each separated section of pipe is controlled by at what point attachment 80 is inserted, there are other factors which have some effect. For example, the winding rate, width of the metal band and pipe diameter must be considered because they will determine the duration of the interval of time that attachment 80 must act on side portion 57 in order to produce at least one free winding. Since it may be common to set up machine 20 to produce several hundred sections of burr-free pipe as part of one production run, with all sections having approximately the same length and same diameter, it is advantageous to control cylinder 87 and tooling attachment 80 automatically. Automatic control is achieved by means of an electric timer 98 (see FIG. 9), which may be, for example, an HG Series timer offered by Eagle Signal of Davenport, Iowa. Timer 98 includes means for setting two time intervals. The first interval set corresponds to the length of time that cylinder 87 is de-engergized and piston 92 retracted. During this interval, interlocked windings will be formed. The second interval corresponds to the length of time that cylinder 87 is energized and piston 92 extended. During this interval of time, tooling attachment 80 will act upon side portion 57 for the formation of at least one free winding. At the conclusion of the second interval of time, the first interval repeats and so on. If one winding takes approximately one second and if it is desired to fabricate sections of pipe each of which has a length of two feet, then with a one-inch wide metal band, the first interval will be approximately 75 seconds and the second interval will be approximately one second. The piping being formed being compressed rather than flexed or extended, such that the space relationship between windings corresponds closely to the arrangement of FIG. 7. Timer 98 controls the electric circuit of hydraulic motor and pump 99 for energizing and de-energizing cylinder 87, as is well known in the art.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

I claim:

1. A method of forming a flexible metal pipe having a plurality of interlocked windings comprising the steps of:
   setting a timer for a first interval of time and for a second interval of time;
   forming a metal band into an interlockable shape;
   spiralling said interlockably shaped metal band into a plurality of interlocked windings, the leading end portion of each winding interlockingly engaging the leading end portion of a corresponding subsequent winding, said interlocking continuing throughout the entire circumference of each winding;
   said metal band being spiralled into said interlocked windings during said first interval; and
   automatically moving a forming tool against said interlockably shaped metal band before it becomes interlocked so as to shape a portion of said interlockably shaped metal band such that at least a portion of the leading end portion of one winding and the leading end portion of said corresponding subsequent winding are prevented from achieving said interlocking engagement thereby forming at least a portion of one free winding between said interlocked windings and said forming tool being moved against said band during said second interval of time.

2. The method of claim 1 which further includes the step of allowing said timer to continue to run thereby alternately repeating said first and second intervals of time, whereby said plurality of interlocked windings are arranged into a plurality of groups, each of said groups being separated by at least a portion of one free winding.

3. The method of claim 2 which further includes, following the allowing step, the step of separating adjacent ones of said plurality of groups by severing said portion of at least one free winding disposed therebetween.

4. The method of claim 3 wherein said severing is achieved by widthwise cutting of that portion of the interlockably shaped metal band forming the particular portion of said one free winding.

5. The method of claim 4 wherein said interlockably shaped metal band comprises:
   an annular top portion;
   an annular bottom portion;

a radial portion connecting adjacent inner ends of said annular portions;

a downturned side portion joined to the outer end of said annular top portion and inclined downwardly therefrom;

an upturned side portion joined to the outer end of said annular bottom portion and inclined upwardly therefrom; and said downturned and upturned side portions being substantially parallel to each other.

6. The method of claim 5 wherein the length of the widthwise cut of said portion of one free winding spans less than 5° of the circumference of said flexible metal pipe.

7. The method of claim 6 which further includes, immediately following the moving step, the step of bending said downturned side portion toward said annular top portion wherein the included angle between said downturned side portion and said annular top portion is less than 10°.

8. An improved flexible metal pipe fabricating machine of the type wherein a relatively thin strip of metal is initially formed into an interlocking shape, and wherein said strip of metal is spirally wound on a mandrel while being acted on by ironer rollers and wherein the leading end portion of a first winding interlockingly engages the leading end portion of a corresponding subsequent winding on the next revolution; wherein the improvement comprises:

a timer having each cycle period separated into two time intervals;

a tooling attachment automatically movable into contact with said first winding prior to said interlocking engagement with said subsequent winding during one of said two time intervals; and said tooling attachment being designed to form said leading end portion during said contact in such a way as to prevent said interlocking engagement from occurring.

9. The improved flexible metal pipe fabricating machine of claim 8 wherein said tooling attachment is attached to the piston arm of a fluid power cylinder.

10. The improved flexible metal pipe fabricating machine of claim 9 wherein said tooling attachment has a roller adjacent one end and a support rod disposed at the opposite end.

11. The improved flexible metal pipe fabricating machine of claim 10 wherein the energizing and de-energizing of said fluid power cylinder is controlled by said timer.

12. The improved flexible metal pipe fabricating machine of claim 11 wherein the time interval of contact of said tooling attachment with said first winding is at least as great as the interval of time required for one winding revolution of said strip of metal.

13. The improved flexible metal pipe fabricating machine of claim 12 wherein prior to interlocking engagement between contiguous windings and prior to engagement by said tooling attachment, said strip of metal forming said winding comprises:

an annular top portion;

an annular bottom portion;

a radial portion connected between adjacent inner ends of said annular portions;

a downturned side portion attached to the outer end of said annular top portion and inclined thereto; and the included angle between said annular top portion and said downturned side portion being less than 90°.

14. The improved flexible metal pipe fabricating machine of claim 13 wherein after contact by said tooling attachment, said downturned side portion is disposed relative to said annular top portion, such that said included angle is less than 10°.

* * * * *